United States Patent

[11] 3,545,339

[72] Inventor Edgar W. Sickmeier
 Greenwood, Indiana
[21] Appl. No. 780,066
[22] Filed Nov. 29, 1968
[45] Patented Dec. 8, 1970
[73] Assignee General Motors Corporation
 Detroit, Michigan
 a corporation of Delaware

[54] DAMPING
 1 Claim, 5 Drawing Figs.
[52] U.S. Cl. .................................................. 92/41;
 137/510
[51] Int. Cl. ........................................... F01b 19/04;
 F16j 3/00
[50] Field of Search .......................................... 92/41, 40;
 277/88, (V.D.); 137/510

[56] References Cited
 UNITED STATES PATENTS
2,094,160 9/1937 Oldberg........................ 286/11
2,301,031 11/1942 Ferguson..................... 92/40X
2,827,077 3/1958 Mitchell....................... 92/41X
3,276,780 10/1966 Anderson et al............. 277/42
3,372,939 3/1968 Coulombe et al............ 92/41X
 FOREIGN PATENTS
 694,447 12/1953 Great Britain................ 277/59

Primary Examiner—Martin P. Schwadron
Assistant Examiner—Leslie J. Payne
Attorneys—Paul Fitzpatrick and E. W. Christen ABSTRACT: An arrangement for damping vibration of an aneroid bellows fixed at one end mounted in a chamber. In one form, a rubber cup lining the chamber has ridges which extend axially of the bellows and engage the convolutions of the bellows. In another form, rubber rods mounted on the wall of the housing engage the convolutions of the bellows.

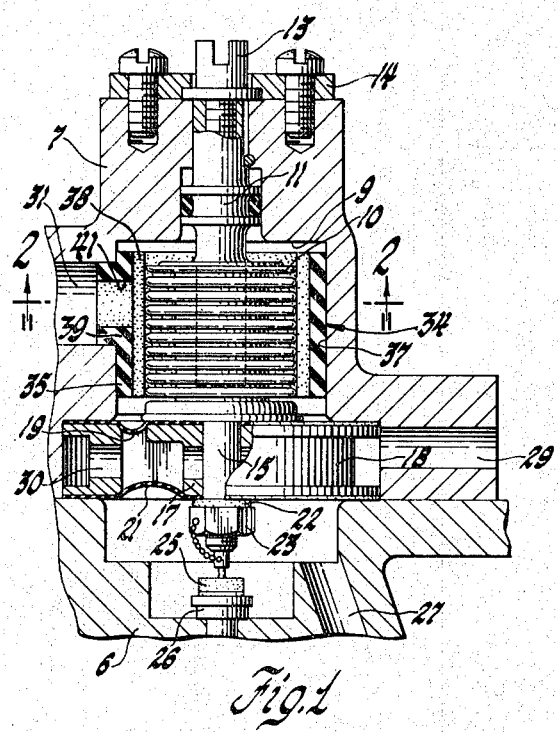

DAMPING

My invention relates in one aspect to means for damping vibrations of elastic bodies and in another aspect to means for increasing the reliability of elastic bellows in environments which vibration of such bellows is likely to be induced.

In its preferred embodiment, the invention is applied to a pilot valve embodying an aneroid bellows which is mounted on an engine. In the original configuration of the device to which the invention is applied, it was found that vibration-induced fatigue of the bellows caused failure. As a result, efforts have been made to provide means to damp such destructive vibration of the bellows without impairing its operation or significantly decreasing the sensitivity of the bellows as, for example, by excessive friction.

The principles of the invention clearly would be applicable to damping vibration of other bodies under somewhat similar conditions as, for example, a coil spring or other elastic device which might be subjected to axial or lateral induced vibrations.

The principal objects of my invention are to provide an improved, simple, and satisfactory vibration damper for elastic bodies having plural convolutions or ribs thereon, to improve the performance and reliability of control devices incorporating bellows, and to provide a vibration damper readily adapted to mounting in a housing enclosing a device the vibration of which is to be damped.

The nature of my invention and its advantages will be clear to those my in the art from the succeeding detailed description of preferred embodiments of the invention.

FIG. 1 is an axial sectional view, with parts cut away, of a pilot valve device embodying my invention.

FIG. 2 is a transverse section of the same taken on the plane indicated by the line 2-2 FIG. 1.

FIG. 3 is an axonometric view of a vibration damper used in the device of FIG. 1.

FIG. 4 is a view of the device of FIG. 1 embodying a second form of vibration damper.

FIG. 5 is a transverse sectional view taken on the plane indicated by the line 5-5 in FIG. 4.

The drawings illustrate the embodiment of my invention in a previously known pressure controlled pilot valve or servovalve which controls the operation of a compressor bleed valve for a gas turbine engine. The structure shown in the drawings is mounted on the gas turbine engine and, therefore, is affected by vibration transmitted to it from operative parts of the engine or gearing driven by the engine.

In FIG. 1, a bleed valve casing 6 which is mounted on the engine has fixed to it a housing 7 defining a chamber 9 within which is mounted an aneroid metal bellows 10. The upper end of the bellows, as illustrated, is fixed to a stem 11 reciprocably and nonrotatably mounted in the end of the housing and adjustable axially by a screw 13, the position of which is maintained by a lock 14. The lower or free end of the bellows is fixed to a reciprocable stem 15 on which is mounted a diaphragm support 17. A fixed diaphragm support ring 18 mounted in a recess in the lower face of the housing abuts the casing 6. A flexible diaphragm 19 is mounted between the upper face of support 17 and the end of the bellows and between the upper face of ring 18 and the housing. A flexible diaphragm 21 is mounted between the lower face of ring 18 and the casing 6 and is held between the lower face of the support 17 and a washer 22 held on the stem 15 by a nut 23. The stem 15 is connected to a movable valve plug 25 which cooperates with a valve seat 26.

Pressure from within the compressor is communicated through a passage 27 to a space below diaphragm 21. Ambient atmospheric pressure is transmitted through a passage 29 and ports 30 in the ring 18 to the space between the two diaphragms 19 and 21. A control pressure is transmitted through a passage or port 31 into chamber 9 and thus to the exterior of bellows 10 and the upper surface of diaphragm 19. The bellows in evacuated in this device. The pilot valve 25, 26 is operated, in response to the various pressures transmitted as mentioned above, to control operation of a compressor bleed valve. There is no need to describe the principles or operation of this device, since such devices are known to those skilled in the art to which it pertains and the function and operation of the bleed valve assembly are not material to an understanding of my invention.

My invention relates solely to the provision of improved means for damping vibration of the cantilevered bellows 10 without setting up undesirable friction which would impair the responsiveness and accuracy of the pilot valve control.

In the preferred embodiment of the invention, this is accomplished by inclusion of the vibration damping means 34 illustrated in FIG. 3. In this form, the vibration damping means comprises a sleeve 35 of an elastomeric rubbery material, the preferred material being known as RTV silicone rubber. Sleeve 35 is dimensioned to fit readily and snugly within the chamber 9 bearing snugly against the cylindrical wall 37. The sleeve 35 bears on its internal surface a number of ridges 38 extending longitudinally of the sleeve and generally parallel to the axis of the bellows 10. Preferably, these ridges are evenly distributed about the axis of the bellows and, in the embodiment illustrated, there are six ridges 38. The damping means 35 includes an integral boss 39 extending from the side wall and fitting within the passage 31 to locate and retain the damping means in the chamber. A hole 41 through this boss provides entry for the control pressure. Damper 35 is made of a rubber which is firm but flexible, being sufficiently flexible so that the sleeve with the boss can be inserted into the cavity 37 by flexing the wall sleeve. Preferably, the hardness of the sleeve material is about 80 durometer. For the particular installation where temperature is reasonably high, a silicone rubber is used.

The closeness of fit between the ridges 38 and the bellows should vary from just line to line to a very slight interference fit. In use, there is some wear, but the structure is found to be very durable and to damp effectively the vibrations, both axial and transverse, so that the previously observed fatigue failures of the bellows are eliminated.

The scale of the structure presumably is immaterial, but it may be mentioned that the bellows is about three-quarters of an inch in diameter.

FIGS. 4 and 5 show another version of the invention which is not considered as suitable for production, but which has been successfully tested. FIGS. 4 and 5 illustrate the same pilot valve and control arrangement as FIG. 1 and, therefore, this need not be described other than to describe the different damper arrangement. Common parts have the same reference numerals in FIGS. 4 and 5 as in FIGS. 1 and 2.

In the device of FIGS. 4 and 5, three grooves 45 of slightly more than half cylindrical configuration are machined in the wall 37 of the housing 7. These grooves are spaced 120° apart around the axis of bellows 10. A cylindrical rubber rod 46 is inserted in each one of the grooves 45. These rods are retained by a snap ring 47 lodged in a circumferential recess in the wall of the housing 7. In this case, also, the rods just touch or bear very lightly against the convolutions of the bellows and serve to damp both lateral and axial vibrations of the bellows. The material may be as described above.

It will be seen that both forms of the invention have in common the presence of a body bearing resilient or elastomeric ridges in position to engage the convolutions of the bellows.

The detailed description of preferred embodiments of the invention for the purpose of explaining the principles thereof is not to be considered as limiting or restricting the invention, since many modifications may be made by the exercise of skill in the art.

I claim:

1. The combination of a housing defining a chamber, an expansible elastic device mounted in said chamber and having one end fixed to the housing, the device having plural circumferential convolutions, and a vibration-damping sleeve of elastomeric material mounted against the wall of the chamber having at least three ridges distributed around the circumference of the sleeve each extending longitudinally of the elastic device and lightly engaging a plural number of convolutions of the device, the sleeve having an opening in its wall and the housing defining a passage entering the chamber intermediate the ends of the sleeve alined with the opening, the sleeve including a hollow boss lodged in the passage, biased into the passage by the elastic property of sleeve, and operative to locate and retain the sleeve in the chamber.